(12) United States Patent
Vassilev

(10) Patent No.: US 10,977,759 B2
(45) Date of Patent: Apr. 13, 2021

(54) PROCESS AND SYSTEM FOR DETECTING AN AERIAL TRANSPORT MODE

(71) Applicant: COMMISSARIAT A L'ENERGIE ATOMIQUE ET AUX ENERGIES ALTERNATIVES, Paris (FR)

(72) Inventor: Andrea Vassilev, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/725,354

(22) Filed: Dec. 23, 2019

(65) Prior Publication Data

US 2020/0202475 A1 Jun. 25, 2020

(30) Foreign Application Priority Data

Dec. 24, 2018 (FR) ...................... 18 74119

(51) Int. Cl.
  *G01L 19/00* (2006.01)
  *G06Q 50/30* (2012.01)
  *G01C 5/06* (2006.01)

(52) U.S. Cl.
  CPC ............... *G06Q 50/30* (2013.01); *G01C 5/06* (2013.01); *G01L 19/00* (2013.01)

(58) Field of Classification Search
  CPC ........... G06Q 50/30; G01C 5/06; G01L 19/00
  See application file for complete search history.

(56) References Cited

U.S. PATENT DOCUMENTS

| 8,718,672 | B2* | 5/2014 | Xie | G01C 22/00 455/456.1 |
| 8,868,616 | B1* | 10/2014 | Otto | G16H 40/67 707/802 |
| 2009/0306839 | A1* | 12/2009 | Youngquist | G01K 15/00 701/14 |
| 2010/0248662 | A1* | 9/2010 | Sheynblat | H04W 52/0274 455/127.1 |
| 2013/0131888 | A1* | 5/2013 | Nutaro | G08G 5/065 701/1 |
| 2014/0031082 | A1* | 1/2014 | Zishaan | G08B 21/12 455/556.1 |
| 2014/0308940 | A1* | 10/2014 | Kwon | H04W 48/02 455/418 |
| 2017/0104864 | A1* | 4/2017 | Tanabe | H04M 1/72563 |
| 2018/0365636 | A1* | 12/2018 | Lucrecio | G06Q 50/30 |
| 2020/0094091 | A1* | 3/2020 | Skaaksrud | B60Q 9/00 |

OTHER PUBLICATIONS

French Preliminary Search Report dated Sep. 27, 2019 in French Application 18 74119 filed on Dec. 24, 2018 (with English Translation of Categories of Cited Documents), citing documents AA-AD therein, 2 pages.

Kartik Sankaran, et al., "Using Mobile Phone Barometer for Low-Power Transportation Contest Detection", Proceedings, 12$^{th}$ ACM Conference on Embedded Network Sensor Systems, 2014, 15 pages.

U.S. Appl. No. 16/533,002, filed Aug. 6, 2019, Vassilev.

* cited by examiner

*Primary Examiner* — Jamel E Williams

(74) *Attorney, Agent, or Firm* — Oblon, McClelland, Maier & Neustadt, L.L.P.

(57) ABSTRACT

A system for detection of an air transport made includes a barometric sensor to measure the values of the atmospheric pressure, and a processing unit to acquire the pressure values and to identify if the transport mode is air transport (aircraft mode), depending on the pressure measurements.

9 Claims, 2 Drawing Sheets

PROCESS AND SYSTEM FOR DETECTING AN AERIAL TRANSPORT MODE

TECHNICAL FIELD

This invention relates to the field of methods and systems for classification of a transport mode and is more particularly applicable to a portable device for detecting an air transport mode.

STATE OF PRIOR ART

There are several applications of automatic classification of the transport mode, for example to estimate the carbon footprint or planning or management of transport means.

At the present time, there are methods that exist that attempt to estimate different transport modes starting from a mobile device using a GPS type receiver. The GPS receiver can be used to calculate the altitude and the speed of the transport means. An air transport mode can then be detected by testing the altitude and the speed relative to predetermined thresholds.

However, there are several major disadvantages with this type of method. A first disadvantage lies in the fact that the GPS receiver is based on a radio wave communication with a set of satellites. The quality of this communication depends on the sensitivity of the receiver, the attenuation of radio waves due to the fuselage, and the relative position of the satellites relative to the receiver. This reduces the detection efficiency, more particularly for a mobile receiver of a passenger in a plane. Another disadvantage is that the GPS is a large energy consumer with about 150 mW, which has the consequence of strongly limiting battery autonomy of the mobile device in the case of prolonged use.

There are other methods that can detect some transport modes without using GPS receivers. Such a method is described in the document by X. Xie et al. entitled «Identifying status based on heterogeneous sensors» U.S. Pat. No. 8,718,672 B2, 2014. This method uses accelerometers and/or barometers to detect the following transport or locomotion modes: car, escalator, elevator, walking and steps. This document does not describe an aircraft mode.

Another method is described in the document by K. Sankaran et al. entitled "Using Mobile Phone Barometer for Low-power Transportation Contest Detection", Proceedings, 12$^{th}$ ACM Conference on Embedded Network Sensor Systems, pp. 191-205, New York, USA, 2014. This method uses a barometer to detect transport modes in land vehicles or walking.

These methods only make a classification of transport modes specific to land vehicles and are not adapted to detections in an aircraft. In particular, the technique in the second document is based on the topography of the road to detect a transport mode in a vehicle.

The purpose of this invention is to propose a method and a system for detection of an air transport mode overcoming the above-mentioned disadvantages and in particular for the supply of a portable device capable of detecting an aircraft mode precisely, robustly and with very little energy consumption.

PRESENTATION OF THE INVENTION

This invention is defined by a system for detection of an air transport made, comprising:
a barometric sensor configured to measure values of the atmospheric pressure, and
a processing unit configured to acquire said pressure values and to identify if the transport mode is air transport (aircraft mode), based on said pressure values. The processing unit comprises:
an acquisition module configured to acquire said pressure values at successive instants at a predetermined sampling frequency,
a circular buffer memory configured to memorise a predetermined number of said pressure values,
a microprocessor configured to calculate the pressure variation between a current pressure value measured at a current instant and a previous pressure value measured at a previous instant and to identify the aircraft mode as a function of said pressure variation.

This detection system uses a test based on a pressure variation ratio assuming a lower or upper pressure difference with a threshold in a given time. Thus, this system can automatically identify aircraft mode robustly using only pressure measurements and consuming very little energy. The barometric sensor is an autonomous and stable sensor that does not generate any random operation while consuming very little energy (about 1 mW). Furthermore, the detection system uses very few calculation steps and does not require any external signal.

According to a first aspect of this invention, the microprocessor is configured to identify that the transport mode is an aircraft mode during the takeoff phase if said pressure variation is less than a first pressure variation and if the difference between said current and previous instants is less than a first predetermined time period, said previous instant representing the start of flight instant.

According to a second aspect of this invention, the microprocessor is configured to identify that the transport mode is an aircraft mode during the landing phase if said pressure variation is greater than a second pressure threshold and if the difference between said current and previous instants is smaller than a second predetermined time period, said current instant representing the end of flight instant.

Advantageously, the microprocessor is configured to estimate the carbon footprint as a function of the path in aircraft mode corresponding to the difference between start and end of flight instants.

This can be used to automatically, simply and robustly estimate the carbon footprint of an aircraft user.

Advantageously, the predetermined number of samples of pressure values stored in the circular buffer memory is greater than the predetermined sampling frequency multiplied by a time period representing the maximum between the first and second predetermined time periods.

For example, the predetermined sampling period is of the order of 1 Hz, the first predetermined time period is of the order of 1000 seconds, the second predetermined time period is of the order of 1500 seconds, the first pressure threshold is of the order of −150 HPa, and the second pressure threshold is of the order of +150 HPa.

The invention also aims at a portable telephone comprising the detection system according to any one of the above characteristics.

The detection application can be used very efficiently in an aircraft because no external signal is necessary and consequently, the application is not affected by attenuation of radio waves due to the fuselage.

The invention also aims at an electronic chip comprising the system according to any one of the above characteristics.

For example, this makes it possible to track a parcel and estimate its carbon footprint.

The invention also aims at a method of detecting an air transport mode, comprising the following steps:
- make measurements of the atmospheric pressure,
- acquire said pressure values at successive instants at a predetermined sampling frequency,
- memorise a predetermined number of samples of said pressure values,
- calculate the pressure variation between a current pressure value measured at a current instant and a preceding pressure value measured at a previous instant, and
- identify if the transport mode is by air, called aircraft mode, as a function of said pressure variation.

DETAILED PRESENTATION OF PARTICULAR EMBODIMENTS

The principle on which the invention is based is to disclose a technique for detection of an air transport mode called aircraft mode based on pressure measurements.

Figure 1:
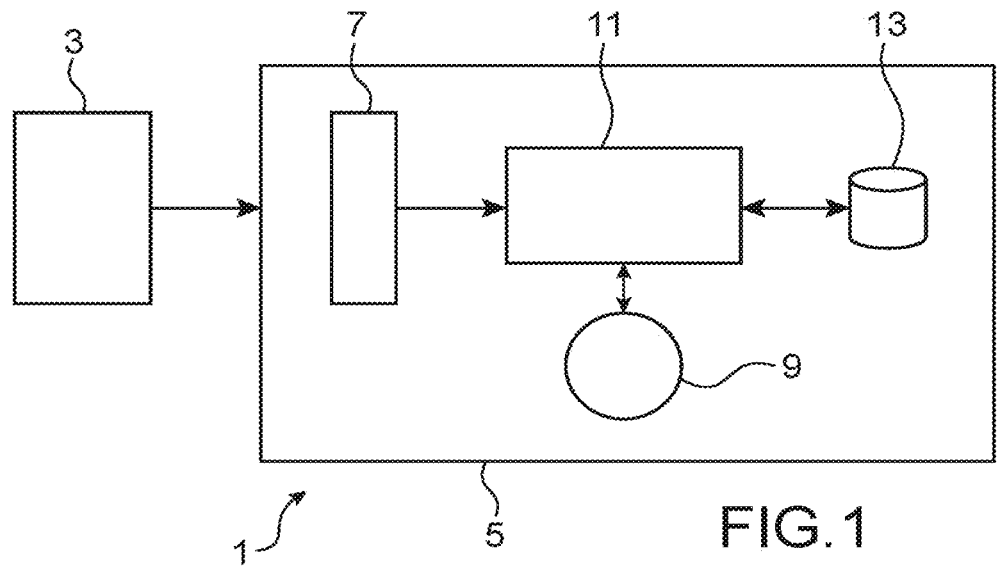
FIG. 1 diagrammatically illustrates a system to detect an air transport mode according to one embodiment of the invention.

FIG. 1 diagrammatically illustrates a system to detect an air transport mode according to one embodiment of the invention.

This detection system 1 comprises a barometric sensor 3 and a processing unit 5. The barometric sensor is configured to measure the values of the atmospheric pressure. The processing unit 5 is configured to acquire pressure values measured by the barometric sensor 3. Furthermore, the processing unit 5 is configured to make use of the fact that the pressure variation is very fast during takeoff and landing phases of an aircraft to identify whether or not the transport mode is an aircraft mode, as a function of pressure measurements.

In particular, the processing unit comprises an acquisition module 7, a circular buffer memory 9, a microprocessor 11 and a memory 13.

The acquisition module 3 is configured to acquire the pressure values at successive instants at a predetermined sampling frequency, The circular buffer memory 9 is a data structure using a fixed size buffer memory, the start and end of which are considered as being connected. The circular buffer memory 9 is then configured to manage data flows and to memorise a predetermined number of samples of pressure values.

Furthermore, the microprocessor 11 is configured to calculate the variation in pressure between a current pressure value measured at a current instant and a previous pressure value measured at a previous instant. The microprocessor 11 can thus identify whether or not the transport mode is an aircraft mode depending on the pressure variation.

Figure 2:
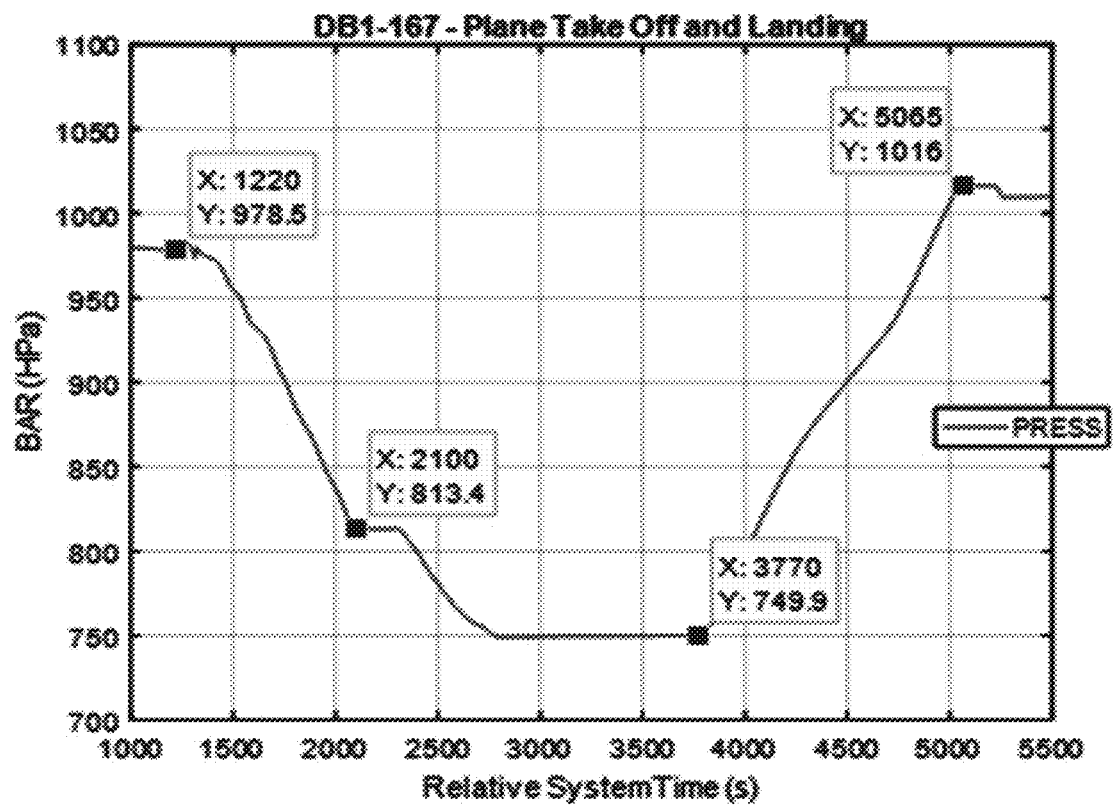
FIG. 2 is a graph illustrating an example of the pressure variation during an aircraft trajectory, according to the invention.

FIG. 2 is a graph illustrating an example of the pressure variation during an aircraft trajectory, according to the invention.

This graph illustrates the pressure as a function of time and shows that the climb and descend phases are the fastest, knowing that the vertical speed set value is less than 2.5 m/s when climbing and less than 1.5 m/s when descending. Furthermore, it is known that the aircraft fuselage is pressurised to about 2000 to 2500 m of altitude (i.e. about 750-800 HPa). These characteristics are used by the microprocessor 11 to identify the aircraft mode as a function of the pressure variation.

The microprocessor 11 is configured to identify that the transport mode is an aircraft mode during the takeoff phase if the pressure variation is less than a first pressure threshold and if the difference between the current and previous instants is less than a first predetermined time period. In this case, the previous instant represents the start of flight instant.

Furthermore, the microprocessor 11 is configured to identify that the transport mode is an aircraft during the landing phase if the pressure variation is more than a second pressure threshold and if the difference between the current and previous instants is less than a second predetermined time period. In this case, the current instant represents the end of flight instant.

These start of flight and end of flight instants can be used to estimate the carbon footprint. The microprocessor 11 is configured to determine the duration D of the path in aircraft mode by calculating the difference between the start of flight instant $t_f$ and the end of flight instant $t_d$ (i.e. $D=t_f-t_d$). The microprocessor 11 then estimates the carbon footprint as a function of the duration D of the path in aircraft mode.

The carbon balance B of a passenger in an aircraft depends on the velocity v of the aircraft, the duration D of the path and the emission E of $CO_2$ per passenger per km using the following formula: $B=E*v*D$.

Typically, the mean velocity of an aircraft v=900 km/h and the emission of $CO_2$ per passenger per km is E=0.285 kg. For example, for a flight lasting 1 h30, the carbon balance of a passenger is $B=0.285*900*1.5=385$ kg of $CO_2$.

Figure 3:
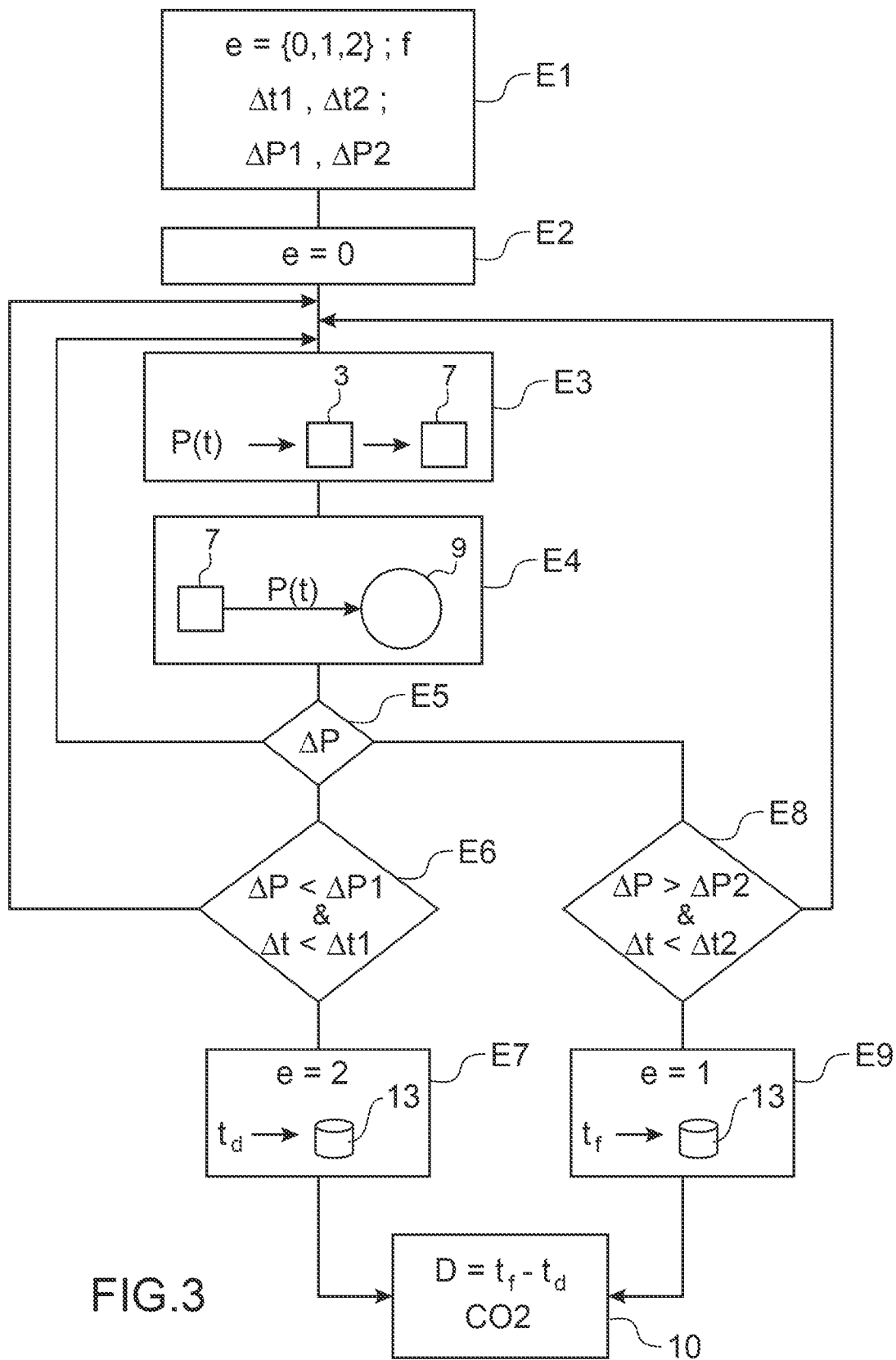
FIG. 3 diagrammatically illustrates steps used to detect an air transport mode with reference to FIG. 1, according to one preferred embodiment of the invention.

FIG. 3 diagrammatically illustrates steps in the detection of an air transport mode with reference to FIG. 1, according to one preferred embodiment of the invention Step E1 is an initialisation step comprising parameters used for the detection of aircraft mode. A state machine e is firstly defined comprising the following three states: unknown state e=0; non-aircraft mode e=1; and aircraft mode e=2. The detection parameters also comprise the following parameters: first predetermined time period $\Delta t1$; second predetermined time period $\Delta t2$; first pressure threshold $\Delta P1$; second pressure threshold $\Delta P2$; and predetermined sampling frequency f.

For example, the predetermined sampling frequency f is of the order of 1 Hz, the first predetermined time period $\Delta t1$ is of the order of 1000 seconds, the second predetermined time period $\Delta t2$ is of the order of 1500 seconds, the first pressure threshold $\Delta P1$ is of the order of −150 HPa, the second pressure threshold $\Delta P2$ is of the order of +150 HPa.

Step E2 is the start up in which the state machine is considered to be in an unknown state e=0.

In step E3, the barometric sensor 3 measures the current value of the pressure P(t) at each current instant t. The pressure values are acquired by the acquisition module 7 at successive instants at a predetermined sampling frequency that in this example is of the order of 1 Hz.

In step E4, each new pressure value P(t) is memorised in the circular buffer memory 9. The capacity of this memory is selected to be sufficiently large to be able to contain a predetermined number N of samples. This number of samples that can be stored in the memory 9 is more than the sampling frequency f multiplied by a time period representing the maximum between the first and second predetermined time periods Δt1 and Δt2, according to the following formula:

$$N > \max(\Delta t1, \Delta t2) * f$$

According to the example of values selected in step E1, the number of samples is of the order of 1500. It will be noted that when the circular buffer memory 9 is full, the new pressure value P(t) is stored replacing the oldest value.

In step E5, the microprocessor 11 is configured to calculate the pressure variation ΔP between the current pressure value P(t) measured at the current instant t and a previous pressure value measured at a previous instant, so as to check if the pressure remains constant, increases or decreases. If the pressure variation ΔP is zero (ΔP=0, i.e. pressure is constant), then the procedure loops back to step E3 to restart the previous steps. If the pressure variation is negative (ΔP<0, i.e. a pressure reduction), then step E6 is started. Otherwise, in other words if the pressure variation is positive (ΔP>0, i.e. a pressure increase), then step E8 is started.

Step E6 applies to the case in which the pressure reduces (ΔP<0). Then in this step, the microprocessor 11 is configured to verify if the pressure reduction is less than the first pressure threshold ΔP1 "and" (in this case the "and" is a conjunction corresponding to the AND combinational operator) if the difference Δt between the current and previous instants is less than the first time period Δt1. If yes (i.e. if ΔP<ΔP1 AND Δt<Δt1) the procedure continues to step E7, otherwise loops back to step E3.

In step E7, since ΔP<ΔP1 AND Δt<Δt1, the microprocessor 11 identifies that the transport mode is an aircraft mode in the takeoff phase. It is then considered that takeoff has just taken place and that it is inside an aircraft. In this case, the state machine changes to aircraft mode (i.e. e=2) and the previous instant that represents the start of flight instant $t_d$ is recorded in the memory 13 of the processing unit 5 and then step E10 is started.

Step E8 applies to the case in which the pressure increases (ΔP>0). Then in this step, the microprocessor 11 is configured to verify if the pressure increase is more than the second pressure threshold ΔP2 "and" if the difference Δt between the current and previous instants is less than the second time period Δt2. If yes (i.e. if ΔP>ΔP2 AND Δt<Δt2) the procedure continues to step E9, otherwise loops back to step E3.

In step E9, since ΔP>ΔP2 AND Δt<Δt2, the microprocessor 11 identifies that the transport mode is an aircraft mode in the landing phase. It is therefore considered that landing has just taken place and that flight is completed. In this case, the state machine changes to non-aircraft mode (i.e. e=1) and the current instant that represents the end of flight instant $t_d$ is recorded in the memory 13 and then step E10 is started.

In step E10, the microprocessor is configured to determine the duration D of the path in aircraft mode by calculating the difference between the start of flight instant $t_f$ and the end of flight instant $t_d$ (i.e. $D=t_f-t_d$).

In step E10, the microprocessor is configured to estimate the carbon (CO2) footprint as a function of the duration D of the path in aircraft mode.

Advantageously, the detection system 1 according to the invention is integrated into a portable telephone, so that a user can for example estimate his or her carbon balance.

Furthermore, the detection system 1 according to the invention is integrated into an electronic chip that may for example be associated with a label to track a parcel.

The invention claimed is:

1. An air transport mode detection system, comprising:
a barometric sensor configured to measure pressure values of atmospheric pressure, and
a processing unit configured to acquire said pressure values and to identify if the transport mode is aircraft mode, depending on said pressure values, the processing unit comprising:
an acquisition module configured to acquire said pressure values at successive instants at a predetermined sampling frequency,
a circular buffer memory configured to store a predetermined number of samples of said pressure values,
a microprocessor configured to
calculate a pressure variation between a current pressure value measured at a current instant and a previous pressure value measured at a previous instant;
determine a time difference between the current instant at which the current pressure value was measured and the previous instant at which the previous pressure value was measured; and
identify the aircraft mode by comparing said pressure variation to at least one of a first pressure threshold and a second pressure threshold and by comparing the time difference to at least one of a first threshold time period and a second threshold time period.

2. The system according to claim 1, wherein the microprocessor is configured to identify that the transport mode is the aircraft mode during takeoff if said pressure variation is less than a first pressure variation corresponding to the first pressure threshold and if the time difference between said current and previous instants is less than a first predetermined time period corresponding to the first threshold time period, said previous instant representing a start of flight instant.

3. The system according to claim 1, wherein the microprocessor is configured to identify that the transport mode is the aircraft mode during landing if said pressure variation is greater than a second pressure variation corresponding to the second pressure threshold and if the time difference between said current and previous instants is smaller than a second predetermined time period corresponding to the second threshold time period, said current instant representing an end of flight instant.

4. The system according to claim 2, wherein the microprocessor is configured to estimate a carbon footprint as a function of duration in the aircraft mode corresponding to a difference between start and end of flight instants.

5. The system according to claim 1, wherein the predetermined number of the samples of the pressure values stored in the circular buffer memory is greater than the predetermined sampling frequency multiplied by a time period representing a maximum between the first and second threshold time periods.

6. The system according to claim 2, wherein the predetermined sampling frequency is about 1 Hz, the first threshold time period is about 1000 seconds, the second threshold time period is about 1500 seconds, the first pressure threshold is about −150 HPa, and the second pressure threshold is about +150 HPa.

7. A smartphone comprising the system according to claim 1.

8. An electronic chip comprising the system according to claim 1.

9. An air transport mode detection method, comprising:
making measurements of atmospheric pressure, acquiring pressure values as measured atmospheric pressure values at successive instants at a predetermined sampling frequency, storing a predetermined number of samples of said pressure values, calculating a pressure variation between a current pressure value measured at a current instant and a preceding pressure value measured at a previous instant, determining a time difference between the current instant at which the current pressure value was measured and the previous instant at which the preceding pressure value was measured, and identifying if the transport mode is an aircraft mode, by comparing said pressure variation to at least one of a first pressure threshold and a second pressure threshold and by comparing the time difference to at least one of a first threshold time period and a second threshold time period.

* * * * *